(12) United States Patent
Shen et al.

(10) Patent No.: US 10,074,161 B2
(45) Date of Patent: Sep. 11, 2018

(54) SKY EDITING BASED ON IMAGE COMPOSITION

(71) Applicant: ADOBE SYSTEMS INCORPORATED, San Jose, CA (US)

(72) Inventors: Xiaohui Shen, San Jose, CA (US); Yi-Hsuan Tsai, Merced, CA (US); Kalyan K. Sunkavalli, San Jose, CA (US); Zhe Lin, Fremont, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/094,799

(22) Filed: Apr. 8, 2016

(65) Prior Publication Data

US 2017/0294000 A1 Oct. 12, 2017

(51) Int. Cl.
*G09G 5/00* (2006.01)
*G06F 3/0482* (2013.01)
*G06F 3/0484* (2013.01)
*G06T 7/40* (2017.01)
*G06T 5/00* (2006.01)

(52) U.S. Cl.
CPC ............ *G06T 5/005* (2013.01); *G06F 3/0482* (2013.01); *G06F 3/04845* (2013.01); *G06T 7/408* (2013.01); *G06T 2207/20084* (2013.01); *G06T 2207/20221* (2013.01)

(58) Field of Classification Search
CPC .... G06F 3/0482; G06F 3/04845; G06T 7/408
USPC ........................................................ 345/619
See application file for complete search history.

(56) References Cited

U.S. PATENT DOCUMENTS 7,227,567 B1 * 6/2007 Beck ...................... H04N 7/147
                                                    348/14.01
9,594,977 B2   3/2017 Lin et al.

OTHER PUBLICATIONS

L. Tao et al., "Skyfinder: Attribute based sky image search", ACM Trans. Graph. (proc. SIGGRAPH) vol. 28, No. 3, Aug. 2009, pp. 68:1-68::5.*
Z. Yan, et al.. "Automatic photo adjustment using deep neural networks", ACM Trans. Graph, vol. 35, No. 2, Feb. 2016, pp. 11:1-11:15.*
J. Long, et al. "Fully convolutional networks for semantic segmentation". Jun. 2015, IEEE Conf. on Computer Vision and Pattern Recognition (CVPR), pp. 3431-3440.*
Y. Tsai, et al. "Adaptive region pooling for object detection", Jun. 2015, IEEE Conf. on Computer Vision and Pattern Recognition (CVPR), pp. 731-739.*

(Continued)

*Primary Examiner* — Jin-Cheng Wang
(74) *Attorney, Agent, or Firm* — Shook, Hardy & Bacon, L.L.P.

(57) ABSTRACT

Embodiments of the present disclosure relate to a sky editing system and related processes for sky editing. The sky editing system includes a composition detector to determine the composition of a target image. A sky search engine in the sky editing system is configured to find a reference image with similar composition with the target image. Subsequently, a sky editor replaces content of the sky in the target image with content of the sky in the reference image. As such, the sky editing system transforms the target image into a new image with a preferred sky background.

20 Claims, 8 Drawing Sheets

(56) References Cited

OTHER PUBLICATIONS

Zhou, B., Lapedriza, A., Xiao, J., Torralba, A., & Oliva, A. (2014). Learning deep features for scene recognition using places database. In Advances in neural information processing systems (pp. 487-495).

Pitié, F., & Kokaram, A. (2007). The linear monge-kantorovitch linear colour mapping for example-based colour transfer. 9 pages.

* cited by examiner

SKY EDITING BASED ON IMAGE COMPOSITION

BACKGROUND

Photos taken outdoors often have the sky as their background. However, many photos containing interesting foreground objects are taken under an uninteresting or undesirable sky (e.g., with dreadful weather, woeful style, overexposed lighting condition, etc.). As such, many users or designers desire to replace the uninteresting sky with another preferred sky. For example, a designer wishes to replace a rainy sky captured in an image with a clear sky.

In some conventional systems, one modifies brightness, contrast, color, etc. of the image in order to obtain a more desired sky view. Such modifications, however, only modify respective global properties of the image and do not offer a replacement sky with desirable sky content.

SUMMARY

Embodiments of the present invention relate to sky editing based on image composition. As described in embodiments herein, a sky editing system determines a feature vector to represent the image composition of a target image, e.g., based on a neural network. In this regard, images sharing the similar composition (e.g., the layout and content) with the target image are retrieved from an image collection based on comparisons between the feature vector of the target image and respective feature vectors of candidate images. Subsequently, the sky editing system facilitates a user to select a preferred sky from those images sharing the similar composition, and generates a new image by replacing the sky at the target image with the preferred sky.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments will be readily understood by the following detailed description in conjunction with the accompanying drawings.

DETAILED DESCRIPTION

Figure 1:
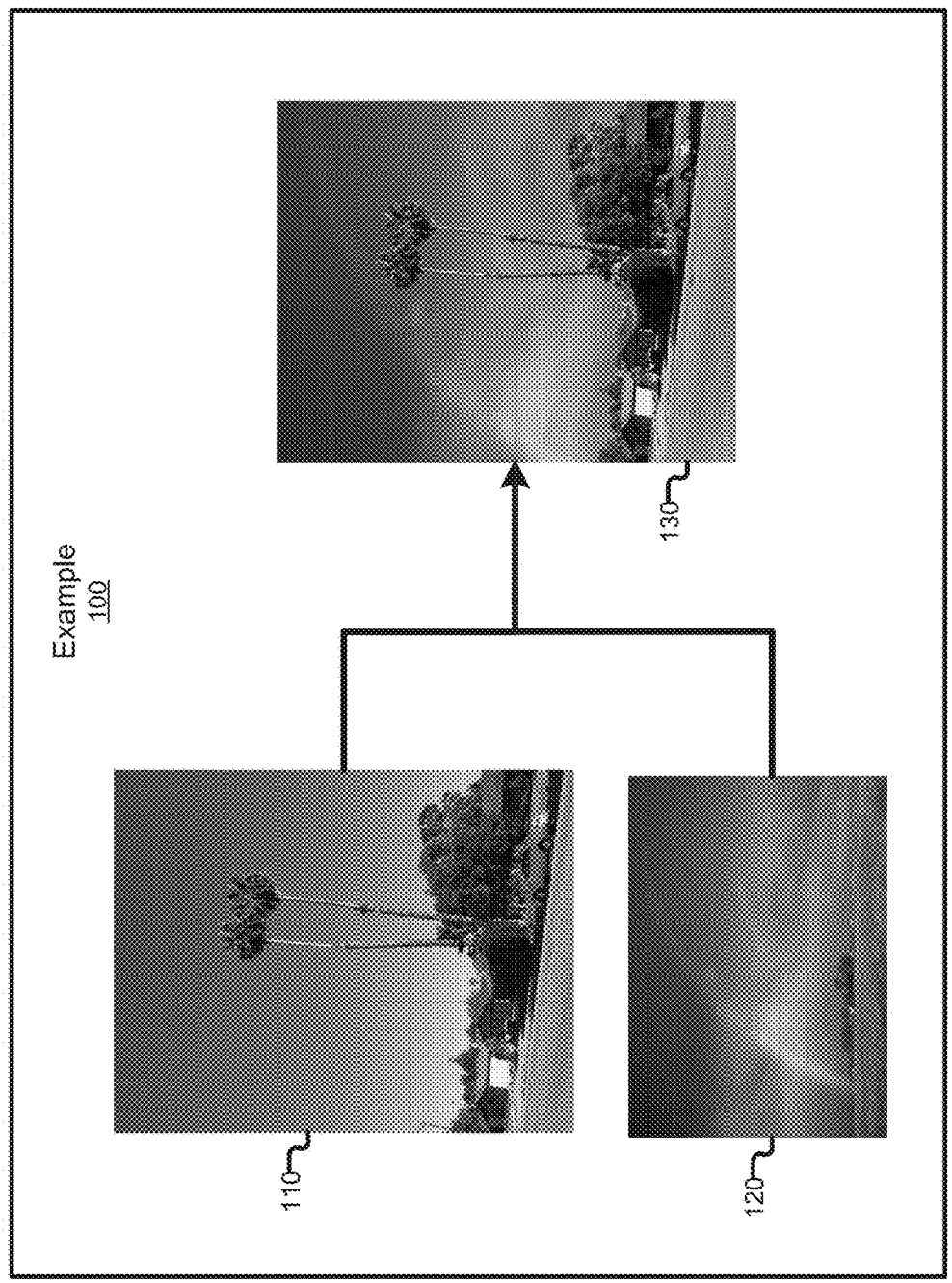
FIG. 1 is a schematic diagram illustrating a sky editing example, incorporating aspects of the present disclosure, in accordance with various embodiments.

Outdoor photos generally include a sky environment as a portion of the photos. In many cases, however, the sky captured in the photo is not desired. By way of example, an interesting landscape shot is ruined by its featureless sky (e.g., rain, cloudy, etc.). In this case, the photographer has to wait a considerably long time to retake the landscape shot until the weather becomes more cooperative and the sky becomes more interesting to the photographer. Alternatively, the photo is to be captured, but not utilized due to the uninteresting or undesired sky environment.

In an effort to generate a more desired sky environment, conventional systems allow color or luminance of an image to be modified. Such a color or luminance application, however, only modifies the global color or luminance of the image and does not change the content of the sky. As a result, desired sky content will not be reflected in the image.

As such, embodiments of the present disclosure relate to a sky editing system and related processes for editing images. In particular, an image with an undesirable sky environment is modified to replace the undesired sky with a desired sky. In this regard, given a target image having an undesirable sky, the sky editing system recommends a set of reference images with potential desirable sky content to the user.

In at least some embodiments of the present disclosure, reference images for sky replacement are selected based on their image composition, such as image layout and/or image content. Image layout generally refers to a layout of an image, such as the arrangement of the sky and the foreground (also referred to as the non-sky part/components in this disclosure), the placement of objects (e.g., human subjects) in the foreground, etc. Image content generally refers to content appearing within an image, such as the presence of different foreground objects and the spatial composition of these objects. In various embodiments, the content of the sky itself, such as clouds, rainbows, etc., should not be considered when searching reference images, so that diverse sky candidates will be identified. "Diverse sky candidates" are those reference images that have sky content different from the target image.

As described in various embodiments herein, the sky editing system uses a trained neural network to generate a feature vector to represent the image composition of a target image, e.g., the layout and content in the target image. Subsequently, the sky editing system retrieves reference images sharing the similar composition with the target image based on comparisons between the feature vector of the target image and respective feature vectors of images in an image bank.

The sky editing system presents the retrieved reference images to a user via a graphic user interface to facilitate the user in selecting a preferred sky from these recommended reference images. Based on the user selection, the sky editing system automatically generates a new image, e.g., by replacing the sky in the target image with the sky, or portion thereof, within the selected reference image. Further, to make the new image visually realistic and holistic, the sky editing system adjusts various characteristics of the foreground in the new image to match the selected sky, e.g., by adjusting the luminance, the color temperature, the saturation, etc., of the foreground in the new image based on the selected reference image.

By way of example, and with reference to FIG. 1, sky editing example 100 in accordance with various embodiments, is illustrated. In the sky editing example 100, target image 110 is an image in which a user wants to replace the sky environment. A sky editing system recommends a set of reference images with diverse sky features to the user, e.g., based on the image composition of target image 110. Then, the user selects reference image 120 from the set of recommended reference images, e.g., based on the user's subjective assessment that reference image 120 has a preferred sky for replacing the sky environment of target image 110.

In particular, target image 110 illustrates a street view of a neighborhood with houses, trees, a car parked on the street, etc. However, the user thinks the sky background on the target image 110 is uninteresting. While not illustrated, there are additional reference images that have been identified and/or presented to the user based on the image composition of target image 110, particularly with similar layout (e.g., ratio of sky vs. non-sky) and/or similar content (e.g., similar foreground objects). After the sky editing system identifies some reference images with similar composition with the target image 110, the sky editing system presents these reference images to the user, e.g., via a graphical user interface.

Upon receiving an input from the user that specifies a selection of one of the images presented, the sky editing system generates a new image 130, which is a holistic composition of the foreground of the target image 110 and the sky background of the reference image 120. In this regard, the new image 130 is automatically generated e.g., by replacing the sky background in the target image 110 with the selected sky from the reference image 120. Further, to match the foreground of the target image 110 with the replaced sky, the sky editing system adjusts the characteristics of the foreground in the new image 130, e.g., by adjusting the luminance, the color temperature, the saturation, etc., of the foreground in the new image 130 based on the reference image 120. As a result, the sky editing system presents to the user the new image 130 that the user perceives to be more natural and holistic.

Figure 2:
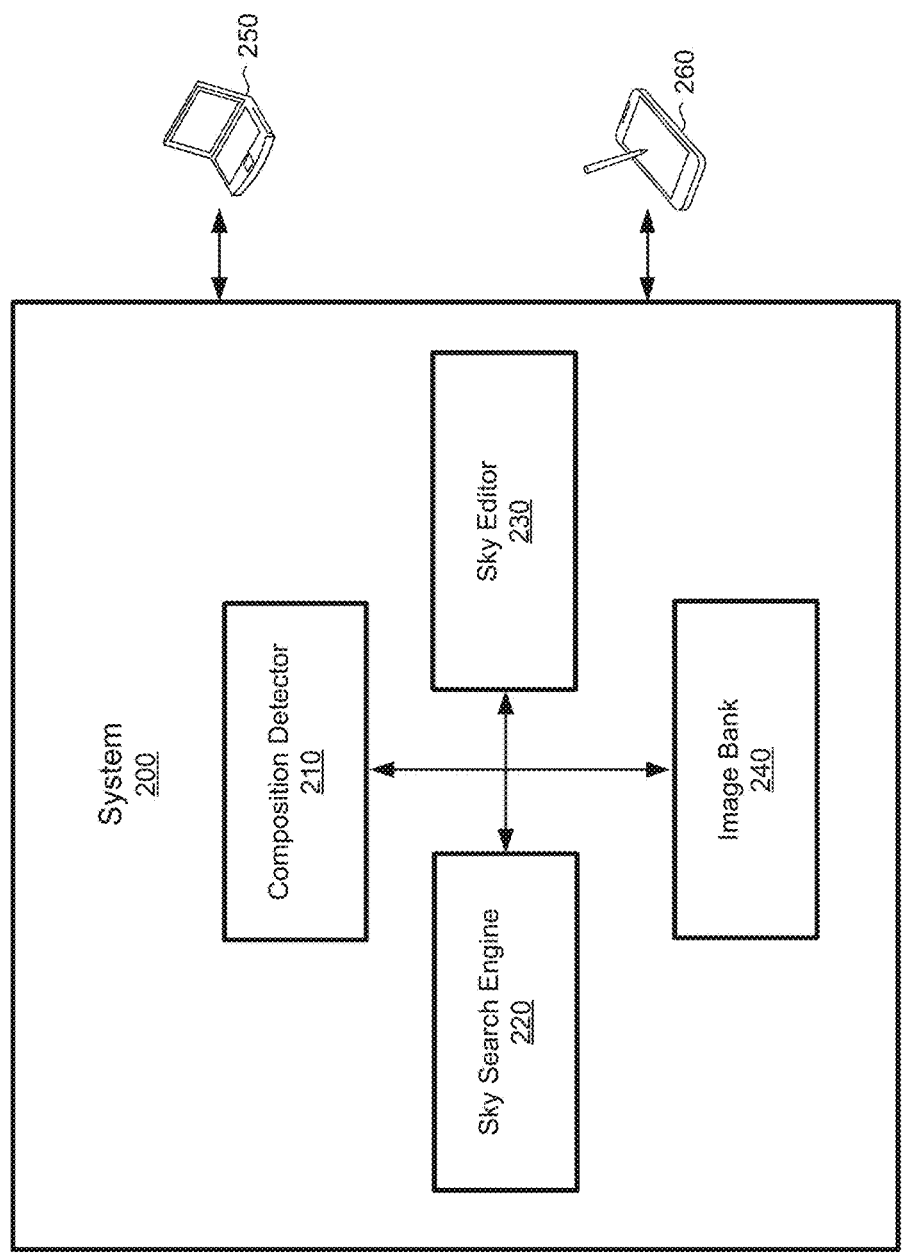
FIG. 2 is a schematic diagram illustrating an example implementation of a sky editing system, incorporating aspects of the present disclosure, in accordance with various embodiments.

Referring now to FIG. 2, a schematic diagram illustrates an example implementation of a sky editing system 200 in accordance with various embodiments. System 200 enables a user to initiate editing the sky background in an image via a user device, e.g., computer 250 or mobile device 260. In other words, system 200 generates a holistic new image by replacing the existing sky background with a preferred sky background, similar to example 100 in FIG. 1. As illustrated in FIG. 2, system 200 includes composition detector 210, sky search engine 220, sky editor 230, and image bank 240, operatively coupled with each other. In some embodiments, system 200 is a server computing device and/or service, such as a server and/or a service provided in a computing cloud, and interacts with user devices (e.g., computer 250 and mobile device 260). In some embodiments, system 200 is located in a user computing device, such as in computer 250 and mobile device 260, or other kind of user devices (not shown). In some embodiments, system 200 is a distributed system.

User devices (e.g., computer 250 and mobile device 260) communicate with system 200 via, e.g., one or more wireless or wired networks. These wireless or wired networks include public and/or private networks, such as, but not limited to, LANs, WANs, or the Internet. In some embodiments, these wireless networks include one or more WPANs, WLANs, WMANs, or WWANs. In some embodiments, these wireless networks include cellular networks, for example, Wideband Code Division Multiple Access (WCDMA), Global System for Mobile Communications (GSM), Long Term Evolution (LTE), and the like.

In various embodiments, a user wants to replace the sky on an image (e.g., target image 110). The user sends the target image to system 200 via a user device (e.g., mobile device 260) coupled to system 200. In response, system 200 returns one or more reference images to the user. These reference images share overall similar image composition with the target image, but with different skies as the background. The user evaluates these reference images and selects one with a preferred sky (e.g., reference image 120 in FIG. 1). Subsequently, system 200 generates a new image (e.g., new image 130 in FIG. 1) by replacing the sky on the target image with the sky from the selected reference image. Finally, system 200 causes the new image to be displayed on a user device.

Referring to system 200, composition detector 210 determines the characteristics of an image that describe or indicate its image composition. In some embodiments, composition detector 210 is utilized in system 200 to detect or characterize respective image composition of target images and reference images, e.g., using descriptive labels to describe their image layouts and content. In one embodiment, composition detector 210 is to cluster a set of training images into subclasses based on descriptive labels generated in accordance with their respective image composition. By way of example, composition detector 210 divides an image into a spatial grid with, e.g., 4 by 4 or 8 by 8 cells. Further, composition detector 210 uses a scene classification model to classify each cell into various semantic components. As an example, a cell is classified with scene parsing labels, such as 80% sky and 20% building. The histogram of such scene parsing labels forms a one-dimensional vector, which is used as a label to represent the scene composition of the cell in one embodiment. Composition detector 210 further concatenates such labels of individual cell into one label for describing the whole image composition. In this way, the final label captures the layout information (e.g., the ratio between the sky and the non-sky) and/or information of the foreground objects (e.g., the building). In other embodiments, composition detector 210 uses different measures to generate descriptive labels for the image, e.g., based on color histograms of each cell.

In some embodiments, composition detector 210 utilizes a CNN to determine a feature vector of an image to represent the image composition of the image. To train the CNN to produce such feature vectors, the aforementioned descriptive label of a training image is used to facilitate clustering the training image into its subclass of training images. Subsequently, composition detector 210 uses these clustered image groups in a supervised learning process for fine-tuning the CNN to produce suitable features vectors to represent different image composition of different images. Therefore, feature vectors of images determined by the trained CNN are to be used to distinguish images from one another based on their respective image composition. Further, composition detector 210 uses the trained CNN to produce feature vectors for each image in the image bank 240.

Images having similar composition (e.g., layout and/or foreground content) with the target image are good candidates to be recommended by system 200 to users for sky replacements. As such, sky search engine 220 searches image bank 240 for images sharing similar image composition with the target image. Composition detector 210 similarly determines the image composition of the target image, e.g., based on the trained CNN as previously discussed.

In one embodiment, sky search engine 220 inputs the target image onto the CNN to determine a feature vector to represent the image composition of the target image. Further, sky search engine 220 retrieves another feature vector representing the image composition of a reference image. The feature vector of the reference image is predetermined before such search operation in some embodiments. Thereafter, sky search engine 220 computes a distance between the feature vector of the target image and the feature vector of the reference image. If the distance is below a distance threshold, sky search engine 220 determines the reference image shares similar image composition with the target image. Using similar operations, sky search engine 220 outputs a group of top ranked reference images having similar image composition with the target image, e.g., based on the distance between the feature vector of the target image and the respective feature vectors of the reference images. Alternatively, the reference images, having similar image composition with the target image, are randomly selected without ranking. In another embodiment, feature vectors of images in image bank 240 are to be extracted to build a searchable file, e.g., an inverted index, so that sky search engine 220 searches and retrieves feature vectors similar to the feature vector of the target image. As a result, images with similar image composition (e.g., layouts and/or contents) are retrieved as reference images with a variety of skies.

Further, in some embodiments, sky editor 230 further considers a number of properties of a retrieved image, including sky completeness, sky aspect ratio, sky resolution, etc., in order to determine whether the sky at a retrieved image is suitable to replace the sky in the target image. The sky completeness generally refers to the relative size of the sky on an image. In one embodiment, the sky completeness is measured as a ratio of the maximum rectangular sky region in the retrieved image over the sky mask in the retrieved image. The sky mask is a derivative image of the retrieved image by carving out the foreground. If this ratio is greater than a predetermined threshold, this retrieved image will be further considered as a candidate image for recommendation.

Sky aspect ratio refers to the ratio between the width and the height of the sky region, e.g., the maximum rectangle sky region as referred above. Similarly, sky resolution refers to the image resolution of the sky region. Although the sky is less sensitive for scale changes, to ensure the replacement sky is not deformed or twisted greatly for alignment in the new image, sky aspect ratio and resolution will also be considered in selecting suitable reference images to closely match with the target image.

In various embodiments, sky editor 230 automatically generates a new image by replacing the sky in the target image with the sky segmented from a reference image selected by the user. With the sky replacement, the new image has at least two parts, namely the sky part (also interchangeably referred as the "background" in this disclosure) and the non-sky part (also interchangeably referred as the "foreground" in this disclosure).

Further, sky editor 230 transfers a number of image features from the foreground of the reference image to the foreground of the new image in order to make a holistic composite image without major inconsistency between the replaced sky from the reference image and the original foreground from the target image. In some embodiments, sky editor 230 calculates some foreground measures of the reference image, e.g., luminance, color temperature, saturation, etc. Then, sky editor 230 adjusts the foreground of the new image accordingly to obtain luminance, color temperature, saturation, etc. similar to the reference image.

A diverse set of images are to be collected from various sources to image bank 240 in order to provide users with different sky content for replacement. The set of images in image bank 240 encompasses various skies, e.g., blue, cloudy, sunset, sunrise, lightening skies, with various image composition, e.g., different layouts with combinations of horizontal and vertical foreground objects, and with various content, e.g., different foreground objects (trees, mountains, water, buildings, vehicles, etc.).

In some embodiments, image bank 240 accepts user submissions of sky candidates, and/or allows users to share their local images with sky backgrounds. In various embodiments, image bank 240 saves derivative images, such as sky masks, foreground masks, composite images with replaced skies, etc. In some embodiments, image bank 240 makes these new composite images searchable in response to a sky replacement search request.

In other embodiments, system 200 is to be implemented differently than depicted in FIG. 2. As an example, sky editor 230 is to be combined with sky search engine 220 to form a comprehensive component for sky replacement. In some embodiments, components depicted in FIG. 2 have a direct or indirect connection not shown in FIG. 2. In some embodiments, some of the components depicted in FIG. 2 are divided into multiple modules. As an example, sky editor 230 is to be divided into separate modules for sky replacement and foreground and background harmonization. Further, one or more components of system 200 are to be located across any number of different devices or networks. As an example, image bank 240 is to be implemented as an independent subsystem in a data server.

Figure 3:
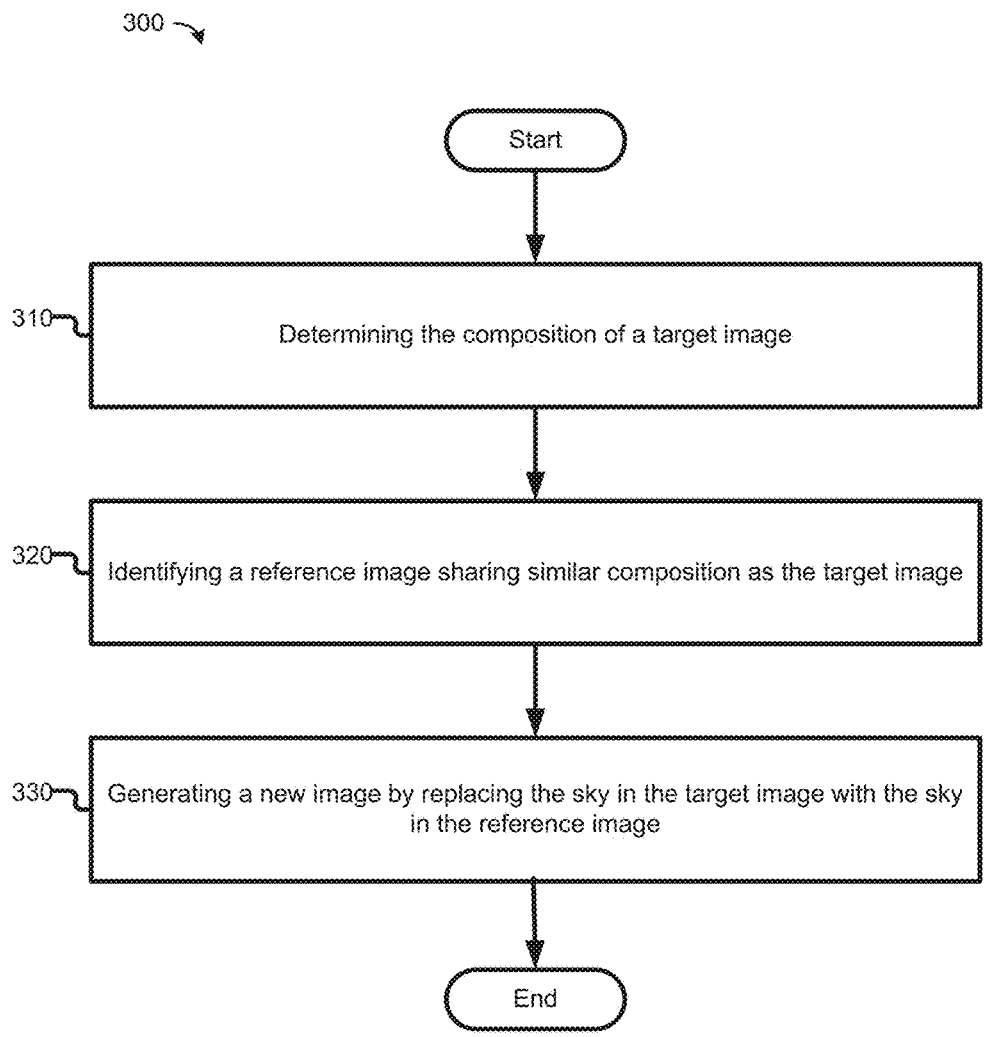
FIG. 3 is a flow diagram of an example process for sky editing, which is to be practiced by an example sky editing system, incorporating aspects of the present disclosure, in accordance with various embodiments.

FIG. 3 is a flow diagram of an example process 300 for sky editing, which is to be practiced by an example sky editing system in accordance with various embodiments. Process 300 is to be performed by processing logic that comprises hardware (e.g., circuitry, dedicated logic, programmable logic, microcode, etc.), software (e.g., instructions run on a processing device to perform hardware simulation), or a combination thereof. The processing logic is to be configured to edit an image including a sky as its background, in particular. As such, process 300 is to be performed by a computing system, e.g., system 200, to implement one or more embodiments of the present disclosure. In various embodiments, process 300 have fewer or additional operations, or perform some of the operations in different orders.

In various embodiments, the process begins at block 310, where the composition of a target image is to be determined, e.g., by composition detector 210 of FIG. 2. In various embodiments, composition of the target image relates to the arrangement of visual objects on the image, e.g., the layout and the disposition of foreground objects. Objects on the target image are often the output of object recognition or scene parsing. In some embodiments, objects on an image are to be recognized based on an object model, e.g., template matching, constellations, bags of features, or shape models, etc. Composition detector 210 uses an efficient and reliable scene parsing system to recognize different objects on the target image and further their unique arrangements on the target image. In some embodiments, a CNN is utilized for sky segmentation and object recognition. The same or a different CNN is used to generate a feature vector to represent the composition of the target image.

At block 320, a reference image sharing similar composition with the target image is to be identified, e.g., based on the feature vector of the target image, e.g., by sky search engine 220 of FIG. 2. In various embodiments, composition of respective images in an image bank is to be identified using similar techniques for identifying the composition of the target image. Therefore, sky search engine 220 is capable to search appropriate images for sky replacement, e.g., by comparing the composition of the target image and the composition of a candidate image.

Images with similar layouts and/or content (e.g., foreground objects) as the target image are good candidates to be recommended to users for sky replacements. In one embodiment, the CNN takes the target image as an input, and outputs a set of top ranked reference images with similar layouts and/or content, e.g., based on the distance between the feature vector of the target image and the respective feature vectors of the candidate images.

Next, at block 330, a new image is to be generated, e.g., by replacing the sky in the target image with the sky in a selected reference image, e.g., by sky editor 230 of FIG. 2. Sky replacement, as used in this disclosure, refers to replacing the content of the sky. In various embodiments, sky replacement means to replace the whole background of an image.

In various embodiments, sky editor 230 conducts a preselection process among a group of images having similar composition with the target image. However, a reference image, even with a similar layout and/or content, sometimes does not necessarily have a suitable sky for replacement. Therefore, sky editor 230 casts away candidate images without a number of required properties, e.g., a certain level of sky completeness, sky aspect ratio, sky resolution, etc. Finally, the user selects one reference image with the most desirable sky among a set of finalists recommended to the user. In one embodiment, sky editor 230 offers a set of preview images with respective replaced skies to facilitate the user making the final decision.

To replace the sky, the maximum rectangular sky region in the sky mask is to be extracted first. Then, the sky editor 230 rescales the extracted sky region to the size of the minimum rectangle that covers all the sky region of the target image. When generating the new image, at least in some embodiments, sky editor 230 also adjusts characteristics of the foreground objects in the new image, e.g., the luminance, the color temperature, the saturation, etc., according to the similar characteristics in the reference image.

Further, to refine details around the boundary between the replaced sky and the foreground, sky editor 230 computes alpha mattes to re-composite the replaced sky and the foreground in the new image in some embodiments. The new image is composed of the background sky layer B and the foreground layer F. An alpha matte defines the transparent or opacity areas of the background and foreground layer. The actual pixel color (C) is represented as a combination of background color (B) and foreground color (F) in, e.g., Eq. 1, wherein $\alpha$ is a scalar for the foreground color.

$$C=\alpha*F+(1-\alpha)B \qquad \text{Eq. 1}$$

Usually, $\alpha$ is 1 for inside the foreground, and $\alpha$ is 0 for inside the sky region alpha=0. Around the boundaries (especially for small foreground regions such as tree branches), $\alpha$ is a value between 0 and 1. In some embodiments, when re-compositing the image, the pixel values around the sky and non-sky boundaries are obtained from Eq. 2, in which Bnew indicates the pixel color value from the new sky.

$$C=\alpha*F+(1-\alpha)B\text{new} \qquad \text{Eq. 2}$$

As a result, the sky editing system presents a new image with a user preferred sky, which is to be appreciated by the user as natural and holistic, by harmonizing the foreground of the new image with the replaced sky.

Figure 4:
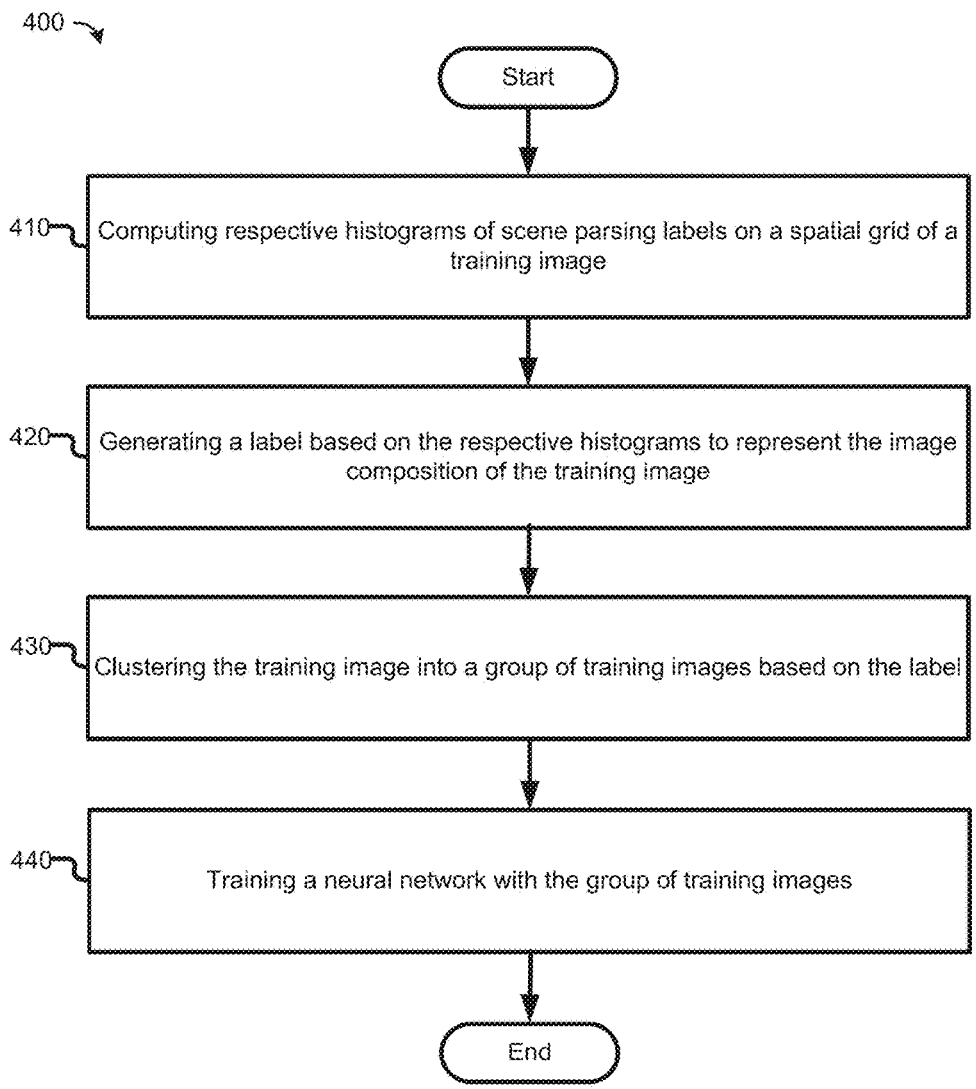
FIG. 4 is a flow diagram of an example process for training a neural network in an example sky editing system, incorporating aspects of the present disclosure, in accordance with various embodiments.

Referring now to FIG. 4, a flow diagram of an example process 400 for training a neural network, which is to be practiced by an example sky editing system in accordance with various embodiments, is provided. As shown, process 400 is to be performed by system 200 of FIG. 2 to implement one or more embodiments of the present disclosure. Similar to process 300, in various embodiments, process 400 has fewer or additional operations, or performs some of the operations in different orders.

Convolutional neural networks are a type of feed-forward artificial neural network, and have wide applications in image and video recognition. In order to generate feature vectors to differentiate different image composition, a CNN is trained with process 400. To train the CNN with training images having diverse sky content, a sky editing system collects images from various sources into a training image collection. Training images not only have various skies, e.g., blue, cloudy, sunset, or lightening skies, but encompass different image layouts and content. Images having similar image composition with the target image usually are good candidates for sky replacements. In process 400, the sky editing system clusters training images into different groups based on their image composition to train the CNN in a supervised learning process.

In various embodiments, process 400 begins at block 410, where respective histograms associated with the scene parsing labels of a spatial grid of a training image is to be computed, e.g., by composition detector 210 of FIG. 2. The training image is divided into a plurality of identifiable cells in a spatial grid. In the context of a spatial index, a grid is a tessellation of a 2-D surface that divides it into a series of contiguous cells, e.g., to be used for spatial indexing purposes. Cells in a grid take the form of rectangular cells, triangular cells, hexagonal cells, diamond-shaped cells, etc. In various embodiments, histograms of ground truth scene parsing labels for each cell are to be computed after scene parsing on the training image.

At block 420, a label is generated to describe the composition of the training image based on the respective histograms obtained at block 410, e.g., by composition detector 210 of FIG. 2. In various embodiments, histograms associated with sequential cells in the grid are used as one-dimensional vectors describing image composition. In some embodiments, such histogram vector is to be concatenated as a feature label to represent the overall composition of the image.

In some embodiments, cells in the grid are selected, e.g., based on a selection criteria, and their respective histogram vectors are to be combined as the feature label. By way of example, one embodiment is to focus on the foreground objects. Only cells determined to be primarily non-sky cells (e.g., with less than 50% sky) will be considered, and their histogram vectors will be combined as the label to describe the image composition. In other embodiments, different selection criteria are to be used, e.g., based on color histograms.

Next, process 400 continues to block 430, where the training image is to be clustered with similar training images into a class of training images based on the feature label, e.g., by composition detector 210 of FIG. 2. As each image is to be represented by a feature label, the training image is clustered into one or more subclasses based on its feature label. A subclass is represented by their common feature label or the common part of their respective feature labels.

Next, process 400 continues to block 440, where a neural network is trained with the subclass of training images, e.g., by composition detector 210 of FIG. 2. A CNN consists of convolutional and subsampling layers optionally followed by fully connected layers. Compared to other image classification algorithms, a CNN needs less preprocessing. In some embodiments, the CNN is obtained based on a pre-trained scene classification model. In some embodiments, the CNN is to be pre-trained on a large data set from a related domain to converge the network parameters. Further, various subclasses of training images obtained at block 430 are to be used as in-domain data to improve the CNN. Such in-domain data with feature labels is fed into the CNN as an additional training step to fine-tune the network weights. Advantageously, only a small amount of in-domain data is needed in this additional training step.

Figure 5:
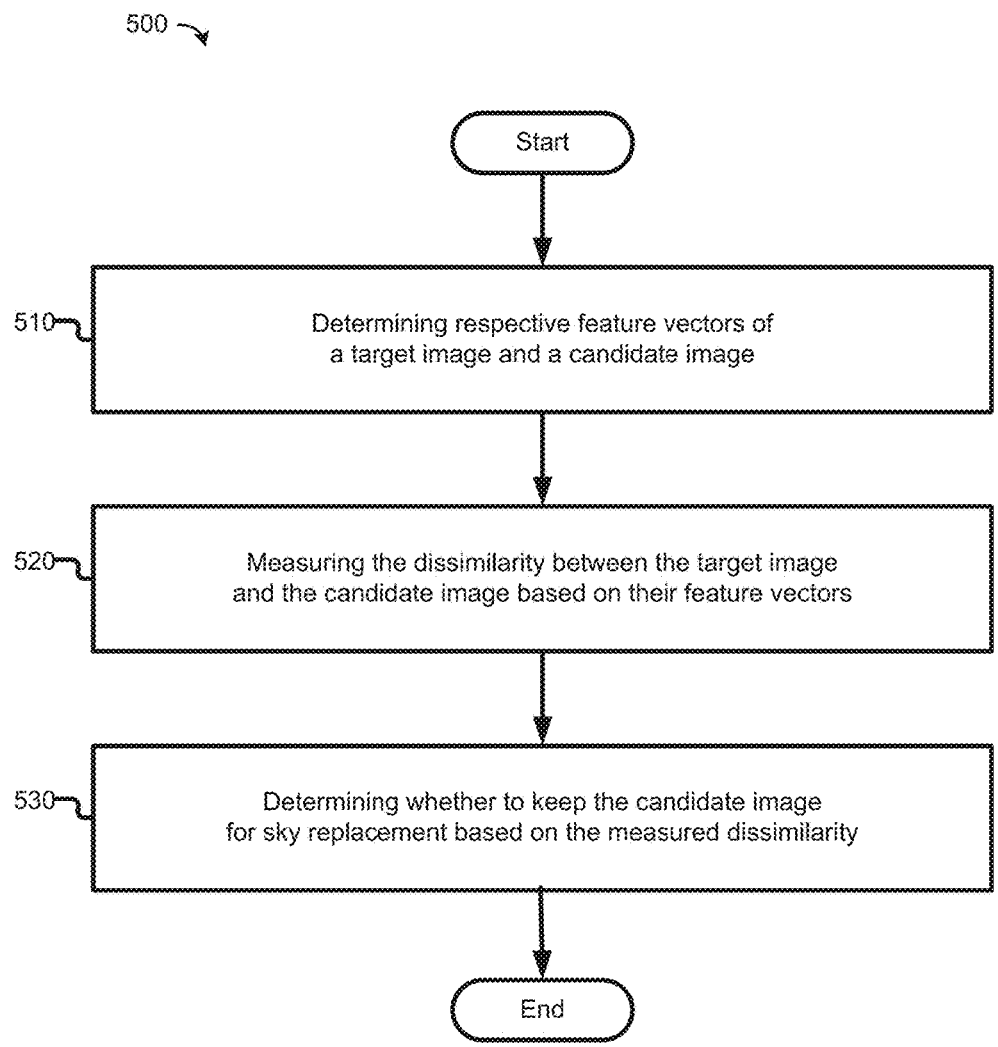
FIG. 5 is a flow diagram of an example process for searching images, which is to be practiced by an example sky editing system, incorporating aspects of the present disclosure, in accordance with various embodiments.

FIG. 5 is a flow diagram of an example process 500 for searching images, which is to be practiced by an example sky editing system in accordance with various embodiments. As shown, process 500 is to be performed by system 200 of FIG. 2 to implement one or more embodiments of the present disclosure. Similar to process 400, in various embodiments, process 500 has fewer or additional operations, or perform some of the operations in different orders.

In various embodiments, process 500 begins at block 510, where respective feature vectors of a target image and a candidate image are to be determined, e.g., by sky search engine 220 of FIG. 2 in utilizing composition detector 210. In the context of neural network analysis, each unique attribute is considered as a feature. An image is represented by a vector of features, where each component in the vector is the value of a feature. As discussed above, the CNN is trained with supervised feature learning from labeled data associated with histograms of ground truth scene parsing labels on a predefined spatial grid of the image. The trained CNN determines respective feature vectors of the target image and the candidate image to represent their respective image composition. Further, in some embodiments, the trained CNN also partitions the set of images into classes of images based on the set of feature vectors representing these images.

At block 520, the dissimilarity between the target image and the candidate image is determined, e.g., by sky search engine 220 of FIG. 2 based on their feature vectors. In various embodiments, the CNN determines the feature vector of the target image as well as the future vector of a candidate image. Accordingly, the dissimilarity between these two feature vectors is determined. There are many viable measures for determining the dissimilarity between two feature vectors, e.g., based on a distance measure. In one embodiment, the Euclidean distance is used as the distance measure between two feature vectors. In some embodiments, the dissimilarity between these two feature vectors is specifically targeted towards the comparison of their respective foreground objects. Therefore, a variety of diverse sky candidates are retained, without affecting the dissimilarity measure.

Next, process 500 continues to block 530, where sky search engine 220 determines whether to keep the candidate image for sky replacement based on the measured dissimilarity. In some embodiments, a maximum distance threshold is predefined to filter out any candidate images significantly dissimilar with the target image based on the distance measure between their respective feature vectors. In some embodiments, candidate images will be ranked based on their respective distance measures, and a predefined number of candidate images will always be retained based on their rankings. As a result, the candidate images most similar to the target image are recommended to the user.

Figure 6:
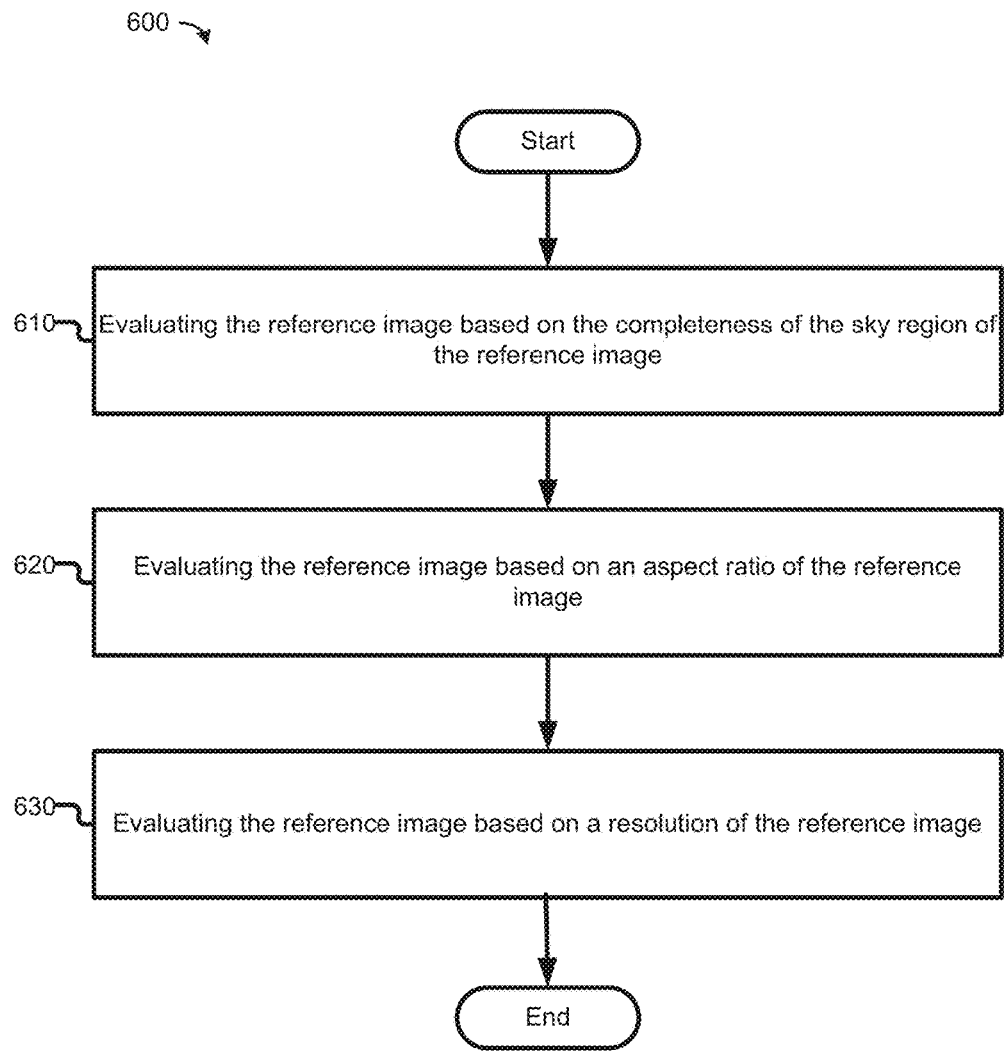
FIG. 6 is a flow diagram of an example process for selecting images, which is to be practiced by an example sky editing system, incorporating aspects of the present disclosure, in accordance with various embodiments.

FIG. 6 is a flow diagram of an example process 600 for selecting images, which is to be practiced by an example sky editing system in accordance with various embodiments. As shown, process 600 is to be performed by system 200 of FIG. 2 to implement one or more embodiments of the present disclosure. Similar to process 500, in various embodiments, process 600 has fewer or additional operations, or performs some of the operations in different orders.

With the fine-tuned CNN, images with similar layouts and/or contents are retrieved as reference images, while the sky variety is not to be restricted. However, it should be further contemplated for a few sky properties, e.g., completeness, aspect ratio, or resolution of the sky, to ensure the replaced sky aligning well with the foreground objects from the target image.

To enhance the set of reference images, in some embodiments, the sky editing system further considers a number of properties of such reference images, including sky completeness, sky aspect ratio, sky resolution, etc., in order to determine whether the sky at a retrieved image aligns well with the target image. In one embodiment, the sky completeness is measured as a ratio of the maximum rectangular sky region in the retrieved image over the sky mask in the retrieved image. A sky mask is the remaining image after removing the non-sky components from the image in an image segmentation process, and a sky mask commonly has irregular edges. If this ratio is smaller than a threshold, this retrieved image is unsuitable to be used as a reference image to be recommended to the user. To eventually align the replacement sky with the target image, the maximum rectangular sky region is rescaled, e.g., to the size of the minimum rectangle that covers all the sky region of the target image. Meanwhile, to ensure the replacement sky is not deformed or twisted greatly for alignment in the new image, sky aspect ratio and resolution will also be considered in selecting suitable reference images.

In some cases, the new image with the replaced sky is not be perceived as a holistic image due to the inconsistency between the replaced sky from the reference image and the original foreground from the target image. However, a visually holistic image is to be created by transferring a number of characteristics from the foreground of the reference image to the foreground of the new image. In one embodiment, foreground statistics of the reference image, e.g., luminance, color temperature, saturation, etc., are calculated and transferred to the new composite image. After transferring statistics, to refine details around the boundary between the replaced sky and the foreground, the sky editing system computes alpha mattes to re-composite the replaced sky and the transformed target foreground.

In various embodiments, process 600 begins at block 610, where the reference image is evaluated based on the completeness of the sky region of the reference image, e.g., by sky editor 230 of FIG. 2. Oftentimes, at least one edge of the segmented sky mask from the reference image is not a straight line due to variety of heterogeneous foreground objects. In some embodiments, sky editor 230 finds the maximum rectangular sky region in the segmented sky mask in the reference image. If the ratio of this rectangle region over the segmented sky mask is smaller than a threshold, the reference image is not a good candidate for sky replacement.

At block 620, the reference image is evaluated based on an aspect ratio of the reference image, e.g., by sky editor 230 of FIG. 2. Although the sky is less sensitive for scale changes, sky editor 230 ensures the sky is not deformed or twisted greatly for alignment. In various embodiments, sky editor 230 computes the aspect ratio of the sky region (e.g., Pa=width/height). Further, a measurement ($M_a$) comparing the aspect ratio between target sky and the replaced sky is calculated in Eq. 3.

$$M_a = \min(Pa_{target}, Pa_{reference})/\max(Pa_{target}, Pa_{reference}) \qquad \text{Eq. 3}$$

$P_{target}$ and $P_{reference}$ are respective aspect ratios for the target and replaced skies. Note that the measurement is from 0 to 1, and a threshold is used to determine whether the reference image should be used for sky replacement based on its aspect ratio measure.

Similarly, at block 630, the reference image is to be evaluated based on a resolution of the reference image, e.g., by sky editor 230 of FIG. 2. In various embodiments, sky editor 230 computes the resolution of the sky region (e.g., Pr=width×height). Further, a measurement comparing the resolution between target sky and the replaced sky is calculated in Eq. 4.

$$M_r = \min(Pr_{target}, Pr_{reference})/\max(Pr_{target}, Pr_{reference}) \qquad \text{Eq. 4}$$

Here, $Pr_{target}$ and $Pr_{reference}$ are respective resolutions for the target and replaced skies. $M_r$ is also from 0 to 1, and a threshold for $M_r$ is used to determine whether the reference image should be used for sky replacement based on its resolution measure.

Figure 7:
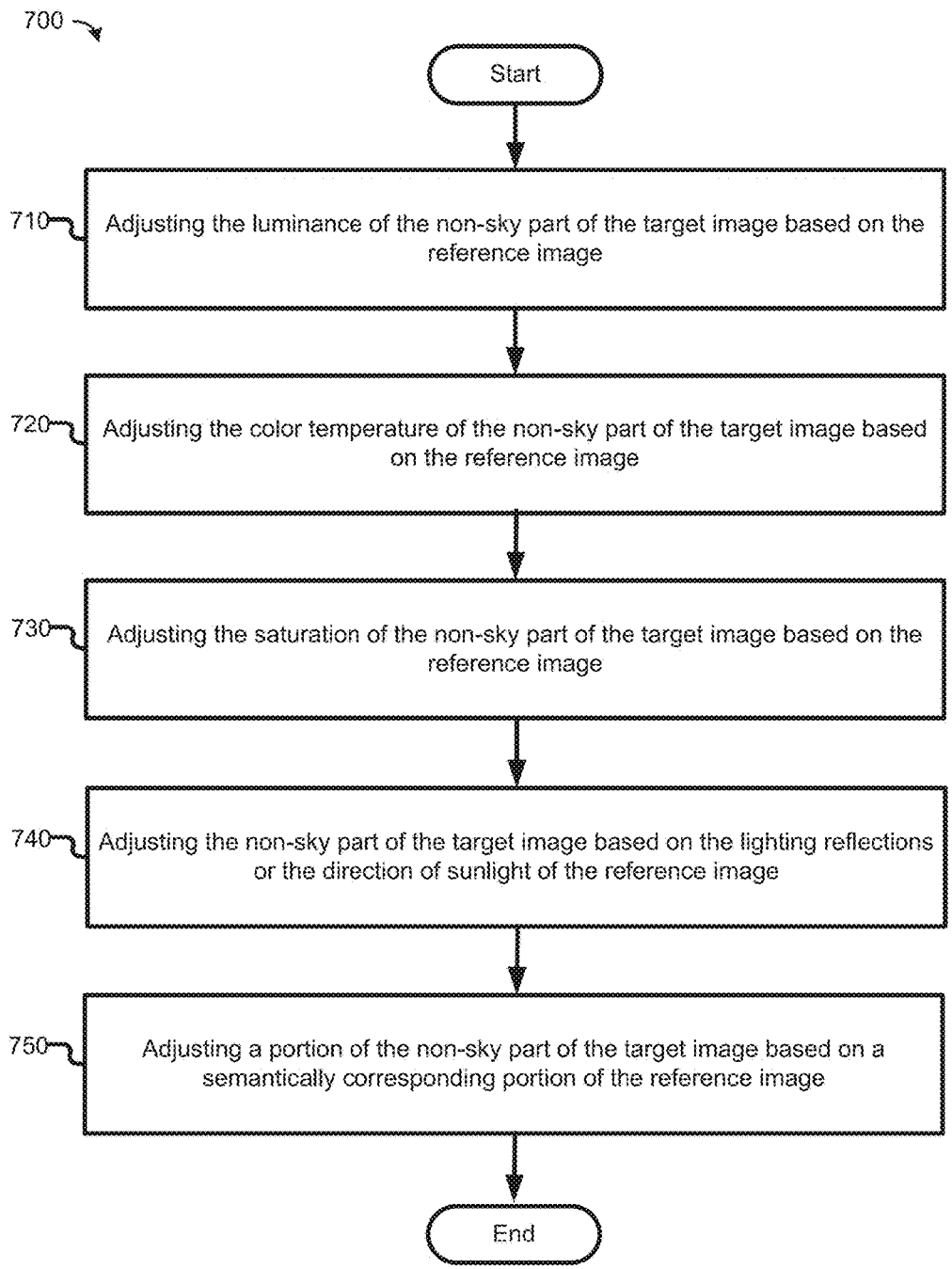
FIG. 7 is a flow diagram of an example process for adjusting images, which is to be practiced by an example sky editing system, incorporating aspects of the present disclosure, in accordance with various embodiments.

Referring now to FIG. 7, a flow diagram of an example process 700 for adjusting images, which is to be practiced by an example sky editing system in accordance with various embodiments, is provided. As shown, process 700 is to be performed by system 200 of FIG. 2 to implement one or more embodiments of the present disclosure. Similar to process 600, in various embodiments, process 700 has fewer or additional operations, or performs some of the operations in different orders.

Sometimes, a user does not perceive an image with a replaced sky as a real image due to the inconsistency between the replaced sky from the reference image and the foreground objects from the target image. To make the new image visually holistic, a few foreground statistics of the reference image are obtained and transferred to the foreground for the new image.

At block 710, the luminance of the non-sky part of the target image is adjusted based on the reference image, e.g., by sky editor 230 of FIG. 2. In some embodiments, the luminance channel in the Lab color space and a weighted luminance from the foreground of the reference image are used. Assume that the foreground lighting condition is similar under similar sky conditions, a weighted mean $w_l \cdot \mu_l^{r/g}$ is computed to shift to the target foreground, where $\mu_l^{r/g}$ is the mean of luminance on the reference foreground, and $w_l$ is the weight defined as $\tanh(\mathrm{dist}(\mu_c^{tsky}, \mu_c^{rsky}))$, where tan h is the hyperbolic tangent function, which measures the color distance between the target sky and the reference sky and further maps to a sigmoid function. In various embodiments, when the target and reference skies share a similar appearance, less luminance needs to be transferred from the reference foreground to the target foreground.

At block 720, the color temperature of the non-sky part of the target image is adjusted based on the reference image, e.g., by sky editor 230 of FIG. 2. Since the foreground appearance between the target and reference image is different in many cases, instead of transferring color statistics, sky editor 230 transfers the tone by computing the color temperature in the XYZ color space. In some embodiments, sky editor 230 uses a smooth transfer function for histogram matching with 32 bins as illustrated in Eq. 3.

$$ct_t(x) = g(ct_r(x)) = \frac{\arctan\left(\frac{m}{\delta}\right) + \arctan\left(\frac{ct_r(x) - m}{\delta}\right)}{\arctan\left(\frac{m}{\delta}\right) + \arctan\left(\frac{ct_r - m}{\delta}\right)} \qquad \text{Eq. 3}$$

Here, $ct_t$ and $ct_r$ are the color temperature of the target and reference foreground, respectively; m and $\delta$ are two parameters of the mapping function, which are estimated by minimizing a cost function measuring the difference between $ct_t$ and $g(ct_r( ))$.

Additionally, a regularized term $w_{ct}$ is used to bind this difference to a certain level, where $w_{ct}$ is computed in the same way as adjusting luminance at block 710.

At block 730, the saturation of the non-sky part of the target image is adjusted based on the reference image, e.g., by sky editor 230 of FIG. 2. Sky editor 230 shifts the mean of saturation from the reference foreground to the target foreground in the HSV color space. This step ensures the consistency of saturation with the replaced sky.

At block 740, the non-sky part of the target image is adjusted based on the lighting reflections or the direction of sunlight of the reference image, e.g., by sky editor 230 of FIG. 2. For some cases when there are lighting reflections from the sky on the foreground, transferring color statistics generates more realistic results. In some embodiments, chrominance channels in the Lab color space are used to adjust the non-sky part of the target image based on the lighting reflections or the direction of sunlight of the reference image. As an example, the chrominance distribution of an image is modeled using a multivariate Gaussian, and a transfer function is created to map the Gaussian statistics between the target image and the reference image.

At block 750, a portion of the non-sky part of the target image is adjusted based on a semantically corresponding portion of the reference image, e.g., by sky editor 230 of FIG. 2. In previous blocks, statistics are transferred globally between foregrounds. However, when the semantic information in the foreground are considered, for example, if there are waters and trees both in the target and reference images, sky editor 230 matches water to water, tree to tree, independently, e.g., based on applying scene parsing or semantic segmentation on the target and reference images, and perform statistic transfer according to different semantic labels individually. After transferring statistics, to refine details around the boundary, sky editor 230 computes alpha mattes to re-composite the replaced sky and the transformed target foreground.

Figure 8:
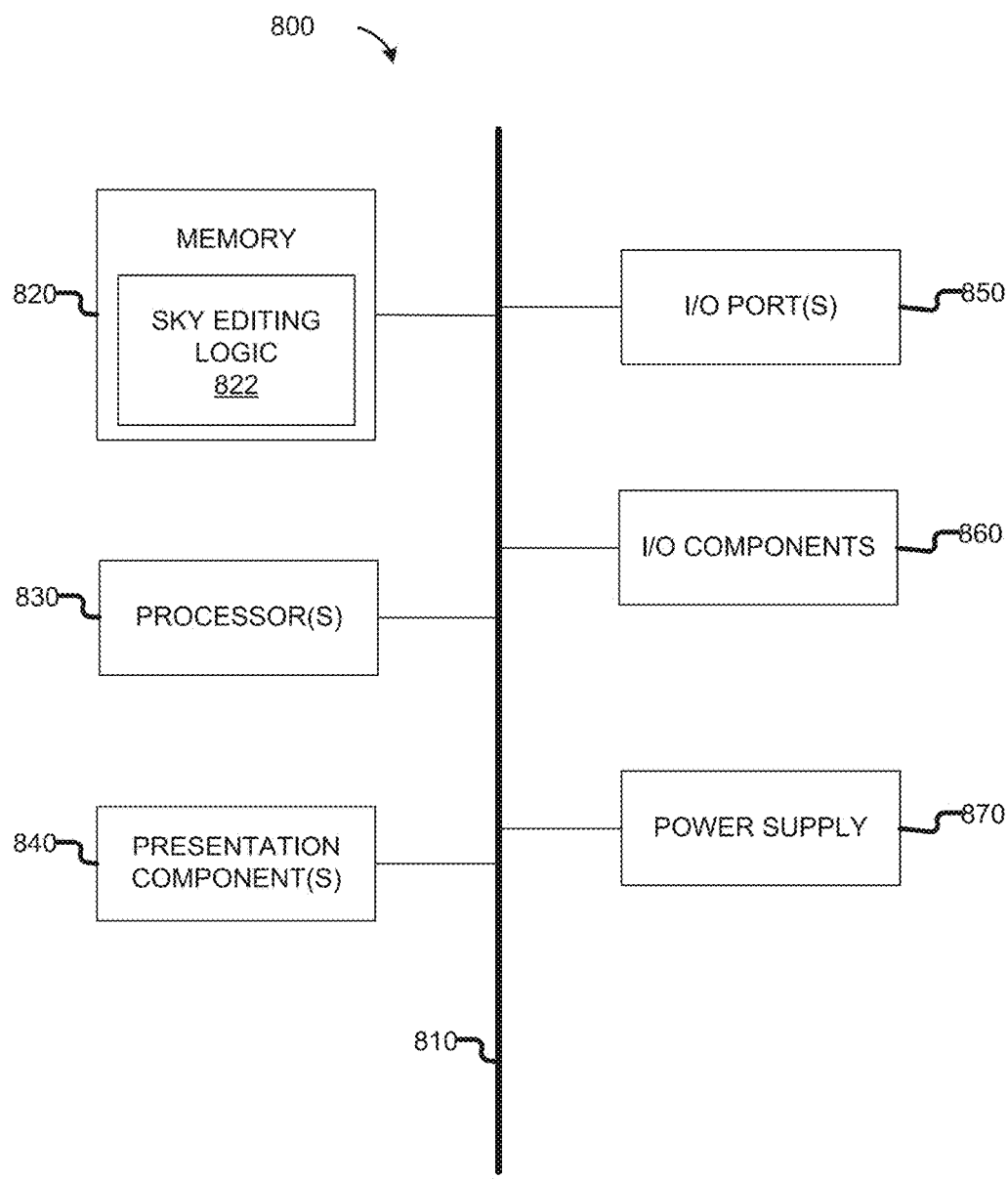
FIG. 8 illustrates an example computing device suitable for practicing the disclosed embodiments, in accordance with various embodiments.

Having briefly described an overview of embodiments of the present invention, an exemplary operating environment in which embodiments of the present invention is to be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The disclosure is described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The embodiments of this disclosure are to be practiced in a variety of system configurations, including handheld devices, consumer electronics, general-purpose computers, more specialty computing devices, etc. The embodiments of this disclosure are to be practiced in distributed computing environments where tasks are performed by remote-processing devices that are linked through a communications network.

With reference to FIG. 8, computing device 800 includes a bus 810 that directly or indirectly couples the following devices: memory 820, one or more processors 830, one or more presentation components 840, input/output (I/O) ports 850, input/output (I/O) components 860, and an illustrative power supply 870. Bus 810 represents one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, a presentation component includes a display device also serves as an I/O component. Also, processors have memory. The inventor recognizes that such is the nature of the art, and reiterates that the diagram of FIG. 8 is merely illustrative of an exemplary computing device that is used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media include any available media that to be accessed by computing device 800, and include both volatile and nonvolatile media, and removable and non-removable media. By way of example, and not limitation, computer-readable media comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which is used to store the desired information and which is accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 820 includes computer-storage media in the form of volatile and/or nonvolatile memory. In various embodiments, the memory is removable, non-removable, or a combination thereof. Exemplary hardware devices include solid-state memory, hard drives, optical-disc drives, etc. Computing device 800 includes one or more processors that read data from various entities such as memory 820 or I/O components 860. Presentation component(s) 840 present data indications to a user or other device. Exemplary presentation components include a display device, speaker, printing component, vibrating component, etc.

In various embodiments, memory 820 includes, in particular, temporal and persistent copies of sky editing logic 822. Sky editing logic 822 includes instructions that, when executed by one or more processors 830, result in computing device 800 providing sky editing capability on an image, such as, but not limited to, process 300, process 400, process 500, process 600, or process 700. In various embodiments, sky editing logic 822 includes instructions that, when executed by processor 830, result in computing device 800 performing various functions associated with, such as, but not limited to, composition detector 210, sky search engine 220, sky editor 230, or image bank 240, in connection with FIG. 2.

In some embodiments, one or more processors 830 are to be packaged together with sky editing logic 822. In some embodiments, one or more processors 830 are to be packaged together with sky editing logic 822 to form a System in Package (SiP). In some embodiments, one or more processors 830 are integrated on the same die with sky editing logic 822. In some embodiments, processor 830 is integrated on the same die with sky editing logic 822 to form a System on Chip (SoC).

I/O ports 850 allow computing device 800 to be logically coupled to other devices including I/O components 860, some of which are built in components. Illustrative components include a microphone, joystick, game pad, satellite dish, scanner, printer, wireless device, etc. In some embodiments, the I/O components 860 also provide a natural user interface (NUI) that processes air gestures, voice, or other physiological inputs generated by a user. In some embodiments, inputs are to be transmitted to an appropriate network element for further processing. An NUI implements any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 is equipped with depth cameras, such as stereoscopic camera systems, infrared camera systems, RGB camera systems, touchscreen technology, and combinations of these, for gesture detection and recognition. Additionally, the computing device 800 is equipped with accelerometers or gyroscopes that enable detection of motion. The output of the accelerometers or gyroscopes is to be provided to the display of the computing device 800 to render immersive augmented reality or virtual reality.

Although certain embodiments have been illustrated and described herein for purposes of description, a wide variety of alternate and/or equivalent embodiments or implementations calculated to achieve the same purposes are to be substituted for the embodiments shown and described without departing from the scope of the present disclosure. This application is intended to cover any adaptations or variations of the embodiments discussed herein. Therefore, it is manifestly intended that embodiments described herein be limited only by the claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A computer-implemented method for editing images, comprising:
   training a neural network with a training image and a composite label generated based at least in part on respective histograms of a plurality of cells of a spatial grid on the training image, wherein the composite label represents an image layout of the training image;
   generating, based on the neural network, a first feature vector of a target image to represent a first image layout of the target image, and a second feature vector of a reference image to represent a second image layout of the reference image;
   computing a distance between the first feature vector of the target image and the second feature vector of the reference image;
   determining the reference image sharing a similar image layout with the target image based on the distance being below a distance threshold; and
   producing a new image by replacing a first content in the target image with a second content in the reference image.

2. The method of claim 1, wherein the first content is a first sky, and the second content is a second sky.

3. The method of claim 1, further comprising:
   delimiting the plurality of cells of the spatial grid with same size; and
   scene parsing the training image with a scene classification model.

4. The method of claim 1, further comprising:
   clustering the training image into a group of training images based on the composite label; and
   training a neural network with the group of training images.

5. The method of claim 1, further comprising:
   identifying one or more candidate images sharing the similar image layout with the target image;
   determining a completeness ratio of a maximum rectangular sky region in a sky mask of a first candidate image of the one or more candidate images over the sky mask; and
   removing the first candidate image from the one or more candidate images when the completeness ratio is less than a completeness ratio threshold.

6. The method of claim 5, further comprising:
   determining a first aspect ratio between a width and a height of a first sky mask of the target image;
   determining a second aspect ratio between a width and a height of a second sky mask for a second candidate image of the one or more candidate images; and
   removing the second candidate image from the one or more candidate images when the second aspect ratio differs from the first aspect ratio more than an aspect ratio difference threshold.

7. The method of claim 5, further comprising:
   determining a first resolution of a first sky mask of the target image;
   determining a second resolution of a second sky mask for a third candidate image of the one or more candidate images; and
   removing the third candidate image from the one or more candidate images when the second resolution differs from the first resolution more than a resolution difference threshold.

8. The method of claim 1, further comprising:
   adjusting a luminance of a non-sky part of the new image based on a color distance between the first sky in the target image and the second sky in the reference image; or
   adjusting the luminance of the non-sky part of the new image based on a mean of luminance on a non-sky part of the reference image.

9. The method of claim 1, further comprising:
   adjusting a first color temperature of a non-sky part of the new image based on a second color temperature of a non-sky part of the reference image; or
   adjusting a first saturation of the non-sky part of the new image based on a second saturation of the non-sky part of the reference image.

10. The method of claim 1, further comprising:
    adjusting a non-sky part of the new image based on lighting reflections from the second sky in the reference image onto a non-sky part of the reference image; or
    adjusting the non-sky part of the new image based on a direction of sunlight in the reference image.

11. The method of claim 1, further comprising:
    applying semantic segmentation on a non-sky part of the new image and a non-sky part of the reference image; and
    adjusting a portion of the non-sky part of the new image based on a semantically corresponding portion of the non-sky part of the reference image.

12. A non-transitory computer storage medium comprising computer-useable instructions that, when used by one or more computing devices, cause the one or more computing devices to perform operations comprising:
    delimiting a training image into a spatial grid;
    generating scene parsing labels for respective cells in the spatial grid via a scene classification model;
    computing histograms of respective scene parsing labels for the respective cells;
    producing a composite label by concatenating the respective histograms of respective cells to represent an overall image composition of the training image;
    training a neural network with the training image based at least in part on the composite label for representing image composition of the training image;
    generating, based on the trained neural network, a feature vector of a target image to represent image composition of the target image;

identifying a reference image sharing similar image composition with the target image based on a comparison between the feature vector of the target image and a feature vector of the reference image; and producing a new image by replacing a first content in the target image with a second content in the reference image.

13. The non-transitory computer storage medium of claim 12, wherein the first content is a first sky and the second content is a second sky.

14. The non-transitory computer storage medium of claim 13, wherein the operations further comprising:

adjusting a luminance of a non-sky part of the new image based on a color distance between the first sky in the target image and the second sky in the reference image;

adjusting the luminance of the non-sky part of the new image based on a mean of luminance on a non-sky part of the reference image;

adjusting a first color temperature of the non-sky part of the new image based on a second color temperature of the non-sky part of the reference image; or adjusting a first saturation of the non-sky part of the target image based on a second saturation of the non-sky part of the reference image.

15. The non-transitory computer storage medium of claim 12, wherein the operations further comprising:

clustering the training image into a group of training images based on the composite label; and training the neural network with the group of training images.

16. A system for editing images, comprising:

a processor;

a composition detector, operatively coupled to the processor, to compute respective histograms of scene parsing labels of a plurality of cells in a spatial grid of a training image, to train a system based at least in part on a composite label generated from the respective histograms for describing image composition of the training image, and to determine a feature vector of a target image to represent image composition of the target image;

a sky search engine, operatively coupled to the composition detector, to search one or more reference images sharing a similar image composition with the target image from a plurality of images based on the feature vector; and a sky editor, operatively coupled to the sky search engine, to replace content of a first sky in the target image with content of a second sky in a reference image from the one or more reference images.

17. The system of claim 16, wherein the composition detector is further to cluster the training image into a group of training images based on the label, and enable supervised learning with the group of training images.

18. The system of claim 16, wherein the sky search engine is further to compute respective distances between the feature vector of the target image and respective feature vectors of a plurality of candidate images, and identify one or more candidate images with a distance of the respective distances being below a predefined distance threshold.

19. The system of claim 18, wherein the sky search engine is further to determine a completeness ratio of a maximum rectangular sky region of a sky mask of a first candidate image of the one or more candidate images over the sky mask, and remove the first candidate image from the one or more candidate images when the completeness ratio is less than a predefined ratio threshold; determine a first aspect ratio between a width and a height of a first sky mask of the target image, determine a second aspect ratio between a width and a height of a second sky mask for a second candidate image of the one or more candidate images, and remove the second candidate image from the one or more candidate images when the second aspect ratio differs from the first aspect ratio more than a predefined aspect ratio threshold; or determine a first resolution of the first sky mask of the target image, determine a second resolution of the second sky mask for a third candidate image of the one or more candidate images, and remove the third candidate image from the one or more candidate images when the second resolution differs from the first resolution more than a predefined resolution threshold.

20. The system of claim 16, wherein the sky editor is further to adjust a luminance of a non-sky part of the target image based on a color distance between the first sky in the target image and the second sky in the reference image; adjust the luminance of the non-sky part of the target image based on a mean of luminance of the non-sky part of the reference image; adjust a first color temperature of the non-sky part of the target image based on a second color temperature of the non-sky part of the reference image; adjust a first saturation of the non-sky part of the target image based on a second saturation of the non-sky part of the reference image; adjust the non-sky part of the target image based on lighting reflections from the second sky in the reference image onto the non-sky part of the reference image; adjust the non-sky part of the target image based on a direction of sunlight in the reference image; or apply semantic segmentation on the non-sky part of the target image and the non-sky part of the reference image, and adjust a portion of the non-sky part of the target image based on a semantically corresponding portion of the non-sky part of the reference image.

* * * * *